US012736810B2

(12) United States Patent
Kasazumi et al.

(10) Patent No.: US 12,736,810 B2
(45) Date of Patent: Sep. 15, 2026

(54) LIGHT GUIDE AND DISPLAY DEVICE INCLUDING A HOLOGRAPHIC OPTICAL ELEMENT

(71) Applicant: Panasonic Automotive Systems Co., Ltd., Kanagawa (JP)

(72) Inventors: Ken'ichi Kasazumi, Osaka (JP); Kosuke Imawaka, Kyoto (JP); Keiji Sugiyama, Kyoto (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 272 days.

(21) Appl. No.: 18/612,787

(22) Filed: Mar. 21, 2024

(65) Prior Publication Data

US 2024/0329399 A1 Oct. 3, 2024

(30) Foreign Application Priority Data

Mar. 31, 2023 (JP) ................................ 2023-058861

(51) Int. Cl.
*G02B 27/01* (2006.01)
*G02B 6/42* (2006.01)

(52) U.S. Cl.
CPC ....... *G02B 27/0103* (2013.01); *G02B 6/4206* (2013.01)

(58) Field of Classification Search
CPC ......................... G02B 27/0103; G02B 6/4206; G02B 6/0011; G02B 6/0015; G02B 6/0016; G02B 6/0033; G02B 6/0035; G02B 27/01; G02B 27/0101; G02B 2027/0105; G02B 5/32
USPC ............ 359/13, 1, 14, 15, 34; 362/600, 606, 362/615, 616
See application file for complete search history.

(56) References Cited

U.S. PATENT DOCUMENTS

2020/0142120 A1 5/2020 Meyer Timmerman Thijssen et al.
2022/0091421 A1 3/2022 Kasegawa
2023/0236424 A1* 7/2023 Lowney ............... G02B 6/0058 385/37

FOREIGN PATENT DOCUMENTS

JP 2020-112746 7/2020
JP 2022-506595 1/2022

OTHER PUBLICATIONS

Office Action issued in Corresponding JP Patent Application No. 2023-058861, dated May 12, 2026, along with an English translation thereof.

* cited by examiner

*Primary Examiner* — Arnel C Lavarias
(74) *Attorney, Agent, or Firm* — Greenblum & Bernstein, P.L.C.

(57) ABSTRACT

A light guide includes: a holographic optical element that receives image light emitted from an image light emitter; and a light guide member that includes the holographic optical element. In an intensity distribution of the image light diffracted by and emitted from the holographic optical element, intensity is smaller in an end portion of the intensity distribution than in an intermediate portion of the intensity distribution.

9 Claims, 9 Drawing Sheets

LIGHT GUIDE AND DISPLAY DEVICE INCLUDING A HOLOGRAPHIC OPTICAL ELEMENT

CROSS REFERENCE TO RELATED APPLICATION

The present application is based on and claims priority of Japanese Patent Application No. 2023-058861 filed on Mar. 31, 2023.

FIELD

The present disclosure relates to a light guide and a display device.

BACKGROUND

As conventional technology, a light guide plate for head-up display that includes a plurality of holographic optical elements in the light guide plate is known. For example, Patent Literature (PTL) 1 discloses an optical device that includes: a first light guide plate; a second light guide plate; a first deflection unit that is provided on the first light guide plate and has a volume hologram diffraction grating; and a second deflection unit that is provided on the second light guide plate and has a volume hologram diffraction grating, wherein each of the first deflection unit and the second deflection unit that emits diffracted light.

CITATION LIST

Patent Literature

PTL 1: Japanese Unexamined Patent Application Publication No. 2020-112746

SUMMARY

However, the optical device according to PTL 1 can be improved upon.

In view of this, the present disclosure provides a light guide and a display device that are capable of improving upon the above related art.

According to the present disclosure, the quality of images projected onto a display medium can be improved.

A light guide according to an aspect of the present disclosure includes: a holographic optical element that receives image light emitted from an image light emitter; and a light guide member that includes the holographic optical element. In an intensity distribution of the image light diffracted by and emitted from the holographic optical element, intensity is smaller in an end portion of the intensity distribution than in an intermediate portion of the intensity distribution.

The light guide and the like according to the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 4 is a diagram showing holographic optical elements included in the display device according to the embodiment and the diffraction efficiency of each of the holographic optical elements.

FIG. 5A is a diagram illustrating first image light emitted from a first holographic optical element when image light rays with different angles of view enter into the first holographic optical element.

FIG. 5B shows intensity distributions according to a comparative example.

DESCRIPTION OF EMBODIMENT

Figure 1A:
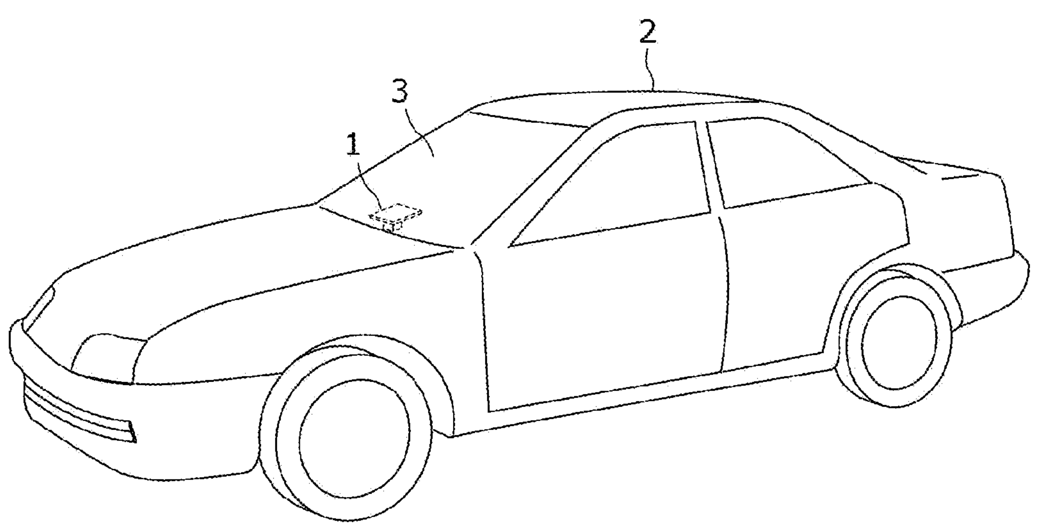
FIG. 1A is a schematic diagram showing an example of a vehicle in which a display device according to an embodiment is installed.

Hereinafter, an embodiment will be described specifically with reference to the drawings.

The embodiment described below shows a generic or specific example of the present disclosure. The numerical values, shapes, materials, structural elements, the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements.

In addition, the diagrams are schematic representations, and thus are not necessarily true to scale. Also, in the diagrams, structural elements that are the same are given the same reference numerals.

Also, in the following embodiment, expressions such as "rectangular", "generally parallel", and "X axis direction" are used. For example, the expressions "rectangular", "generally parallel", and "X axis direction" do not only strictly mean completely rectangular, completely parallel, and completely X axis direction, but also mean substantially rectangular, substantially parallel, and substantially X axis direction, or in other words, encompass a margin of about several percent. Also, the expressions "rectangular", "parallel", and "X axis direction" respectively mean rectangular, generally parallel, and X axis direction within a range where the advantageous effects of the present disclosure can be obtained. The same applies to other expressions such as "shape", "generally", and "direction".

Figure 2:
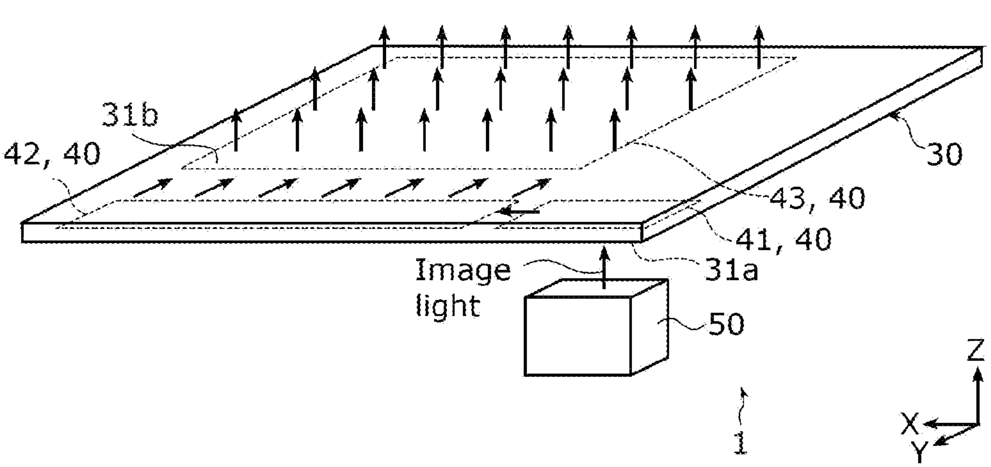
FIG. 2 is a perspective view of the display device according to the embodiment.

In FIG. 2, the arrangement direction of a second holographic optical element relative to a first holographic optical element is defined as the X axis plus direction. The arrangement direction of the second holographic optical element relative to a third holographic optical element is defined as the Y axis plus direction. The arrangement direction of the first holographic optical element relative to an image generation device is defined as the Z axis plus direction. The correspondence relationship shown in FIG. 2 can be applied to other diagrams.

EMBODIMENT

Configuration

First, a configuration of display device 1 will be described with reference to FIGS. 1A to 3.

Figure 1B:
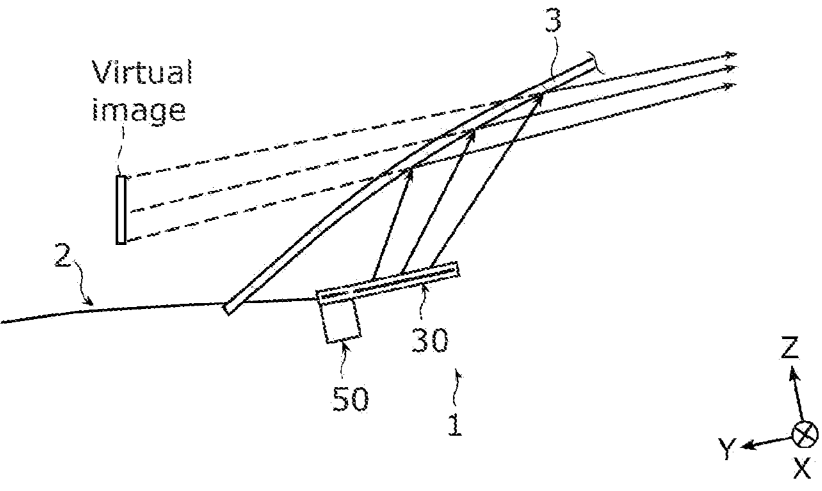
FIG. 1B is a schematic diagram showing the display device and the vehicle and according to the embodiment as viewed from a side of the vehicle.
Figure 3:
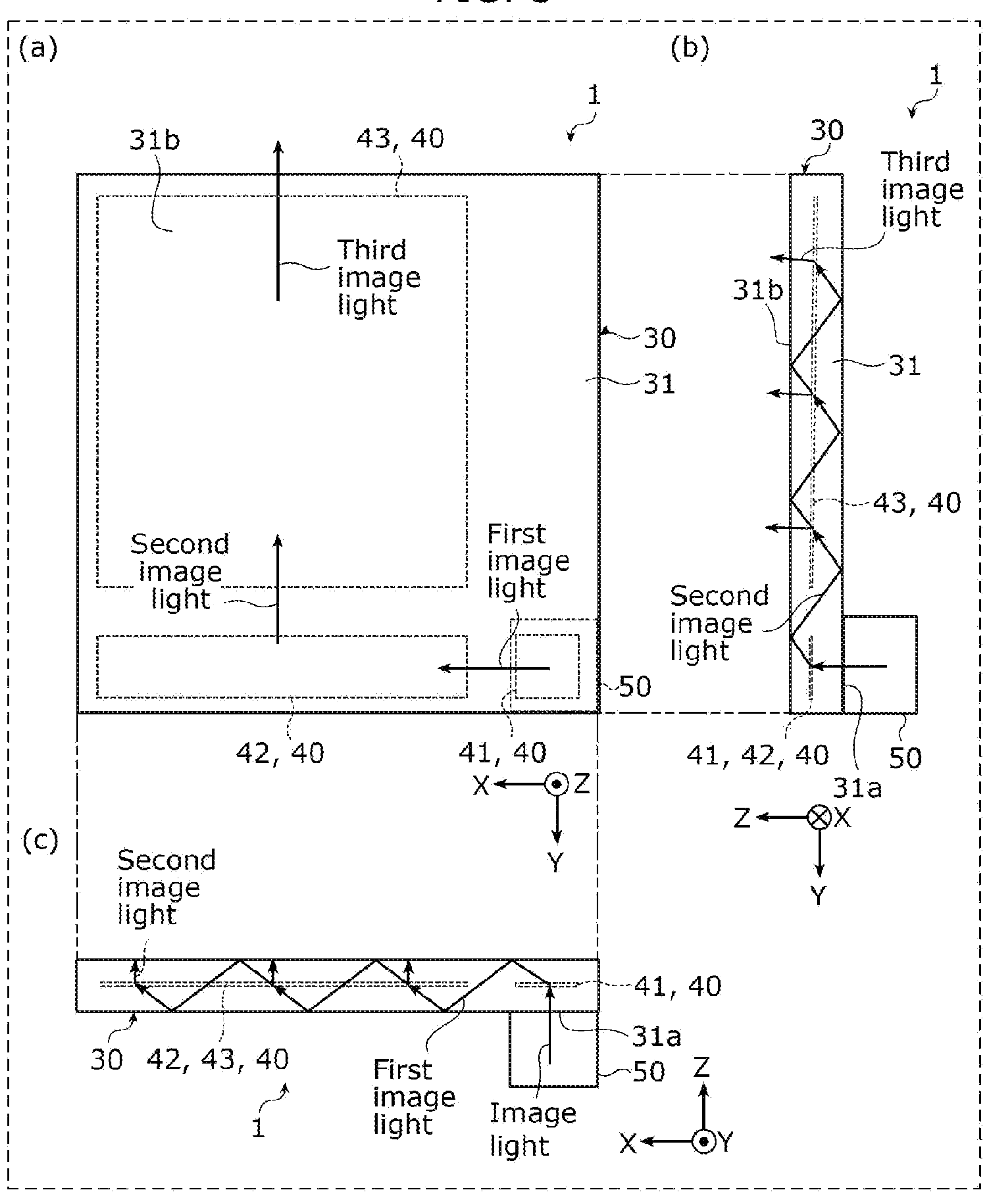
FIG. 3 is a diagram showing the display device according to the embodiment.

FIG. 1A is a schematic diagram showing an example of vehicle 2 in which display device 1 according to an embodiment is installed. FIG. 1B is a schematic diagram showing display device 1 and vehicle 2 according to the embodiment as viewed from a side of vehicle 2. FIG. 2 is a perspective view of display device 1 according to the embodiment. FIG. 3 is a diagram showing display device 1 according to the embodiment, with (a) in FIG. 3 showing a plan view of display device 1, (b) in FIG. 3 showing a side view of display device 1, and (c) in FIG. 3 showing a front view of display device 1.

As shown in FIGS. 1A and 1B, display device 1 emits image light to a light reflector to reflect the image light, thereby causing the image light to enter human eyes. For example, in the case where display device 1 is used in vehicle 2, display device 1 emits image light to a display medium such as windshield 3 that functions as a light transmitting member to reflect the image light, thereby causing the image light to enter human eyes. In this case, as a result of display device 1 emitting image light, an image represented by the image light can be projected onto the light transmitting member, and a virtual image corresponding to the image can be displayed in front of the light transmitting member. As used herein, the term "image light" refers to light that represents an image and causes a virtual image to be displayed in front of windshield 3. The term "image" refers to a still image or a moving image that indicates numbers, text, graphics, and the like.

As shown in FIGS. 1B and 2, display device 1 includes image light emitter 50 and light guide 30.

Image light emitter 50 is an image generation device that emits image light to light guide 30. As a result of image light emitter 50 emitting image light representing a rectangular image, the image light is projected onto windshield 3 via light guide 30. The user can thereby recognize a virtual image corresponding to the rectangular image.

Image light emitter 50 includes a plurality of emitters, a plurality of dichroic mirrors, a condenser lens, a mirror, and a light emitting unit.

The plurality of emitters emit light rays in predetermined wavelength bands that are different from each other. The plurality of dichroic mirrors are provided at positions that are on the light rays emitted from the emitters, each dichroic mirror reflecting a light ray in a predetermined wavelength band and allowing a light ray in another wavelength band to transmit therethrough. The condenser lens is a lens that collects the light rays emitted via the dichroic mirrors at a plurality of mirrors. The light emitting unit is a screen such as a microlens array, a liquid crystal display element such as a liquid crystal on silicon (LCOS), or the like. As a result of light rays in a plurality of wavelength bands being applied from the mirror side, the transmitted light can be emitted toward light guide 30 as image light.

Light guide 30 is a hologram light guide plate that displays, to the user, the image represented by the image light. Light guide 30 has light transmission properties, and thus can stretch the image represented by the image light emitted from image light emitter 50 in the X axis direction and the Y axis direction, and emit the stretched image. Light guide 30 is provided such that one surface (light-emitting surface 31*b*) opposes windshield 3, and the other surface (light-entering surface 31*a*) opposes image light emitter 50.

Light guide 30 has light-entering surface 31*a* and light-emitting surface 31*b*.

Light-entering surface 31*a* is provided to oppose a light-emitting surface of image light emitter 50. Light-entering surface 31*a* receives the image light emitted from the light-emitting surface of image light emitter 50. Light-entering surface 31*a* is a portion of the underside surface of light guide 30. The term "underside surface" refers to a surface of light guide 30 that is opposite to light-emitting surface 31*b* of light guide 30.

Light-emitting surface 31*b* emits the image light that has received from light-entering surface 31*a* and propagated through light guide 30 to windshield 3. Light-emitting surface 31*b* is provided to oppose windshield 3 and is spaced apart from windshield 3 by a predetermined distance. Light-emitting surface 31*b* is a portion of the front-side surface of light guide 30.

Figure 4:
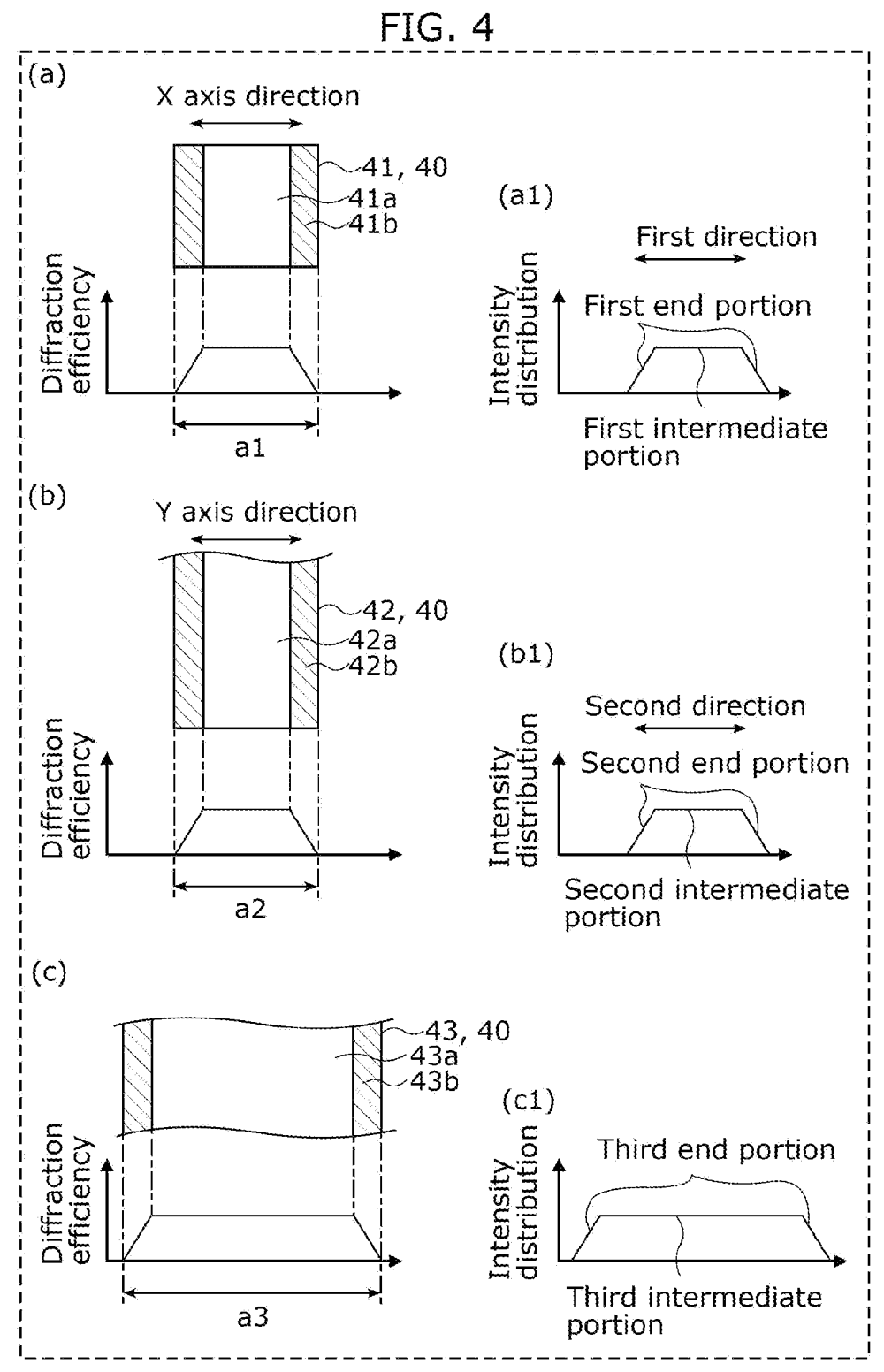

As shown in FIGS. 3 and 4, light guide 30 includes light-transmitting light guide member 31 and a plurality of holographic optical elements 40.

Light guide member 31 includes light-entering surface 31*a* that is provided to oppose image light emitter 50. Light-entering surface 31*a* is a portion of the underside surface of light guide member 31. Also, light guide member 31 includes light-emitting surface 31*b* that is provided to oppose windshield 3. Light-emitting surface 31*b* is a portion of the front-side surface of light guide member 31.

Light guide member 31 is formed using, for example, a light transmitting material such as glass or a resin material. Light guide member 31 includes a plurality of holographic optical elements 40. As shown in FIG. 3, the plurality of holographic optical elements 40 are light transmitting optical elements that diffract and emit light propagating through light guide member 31. The plurality of holographic optical elements 40 are included in light guide member 31 such that the plurality of holographic optical elements 40 are generally parallel to light-entering surface 31*a* and light-emitting surface 31*b* of light guide member 31.

The plurality of holographic optical elements 40 described above are formed using a light transmitting material. The plurality of holographic optical elements 40 include first holographic optical element 41, second holographic optical element 42, and third holographic optical element 43. In the present embodiment, three holographic optical elements are shown as the plurality of holographic optical elements 40. However, the number of holographic optical elements is not limited thereto. For example, two holographic optical elements may be used as the plurality of holographic optical elements 40. Specifically, the plurality of holographic optical elements may include at least two of the following holographic optical elements: a light-entering holographic optical element that receives the image light, a turning holographic optical element that receives the image light, and a light-emitting holographic optical element that receives the image light.

First holographic optical element 41 and second holographic optical element 42 are arranged in the X axis direction. Second holographic optical element 42 and third holographic optical element 43 are arranged in the Y axis direction. Also, first holographic optical element 41 is provided to overlap light-entering surface 31*a* of light guide 30 and also overlap the light-emitting surface of image light emitter 50 that is provided on the Z axis minus direction relative to light guide 30 as viewed in the Z axis direction.

First holographic optical element 41 is a light-entering holographic optical element that receives the image light emitted from image light emitter 50.

First holographic optical element 41 receives the image light that has been emitted from the light-emitting surface of image light emitter 50 and travelled in the Z axis plus direction. First holographic optical element 41 emits the received image light to second holographic optical element 42. Specifically, first holographic optical element 41 emits first image light (deflected light) to second holographic optical element 42, the first image light being obtained as a result of the image light that has been emitted from image light emitter 50 and entered through light-entering surface 31*a* being deflected. More specifically, first holographic optical element 41 deflects the image light by diffraction according to the diffraction efficiency of first holographic optical element 41 while the image light that has entered into light guide 30 is propagating through light guide 30, and emits the deflected image light as the first image light that propagates in the X axis plus direction. The first image light deflected by diffraction in first holographic optical element 41 enters into second holographic optical element 42.

Second holographic optical element 42 is provided at a position that is on the light-emitting side of first holographic optical element 41 in the X axis plus direction relative to first holographic optical element 41 and on the light-entering side of third holographic optical element 43 in the Y axis plus direction relative to third holographic optical element 43.

Second holographic optical element 42 is a turning holographic optical element that is elongated in the X axis direction, diffracts the first image light emitted from first holographic optical element 41, and emits second image light to third holographic optical element 43.

Second holographic optical element 42 receives the first image light emitted from first holographic optical element 41. Second holographic optical element 42 further deflects by diffraction the first image light that has been deflected by diffraction in first holographic optical element 41, and emits second image light (deflected light) obtained as a result of the deflection. Specifically, the first image light that has passed through first holographic optical element 41 enters into (passes through) second holographic optical element 42 while the first image light is repeatedly reflected in the light guide plate. Each time second holographic optical element 42 receives the first image light, second holographic optical element 42 emits second image light to third holographic optical element 43, the second image light being obtained as a result of the received first image light being further deflected by diffraction. More specifically, second holographic optical element 42 further deflects by diffraction the first image light according to the diffraction efficiency of second holographic optical element 42 while the first image light that has entered into second holographic optical element 42 is propagating through light guide 30 in the X axis plus direction. At this time, second holographic optical element 42 stretches the image represented by the first image light in the X axis direction. By doing so, second holographic optical element 42 emits, in the Y axis minus direction, the second image light that has been stretched in the X axis direction. The second image light deflected by diffraction in second holographic optical element 42 enters into third holographic optical element 43.

Third holographic optical element 43 is provided at a position that is on the light-emitting side of second holographic optical element 42 in the Y axis minus direction relative to second holographic optical element 42. Also, third holographic optical element 43 is provided to overlap and oppose light-emitting surface 31*b* of light guide 30.

Third holographic optical element 43 is a light-emitting holographic optical element that has a rectangular shape as viewed in the Z axis direction.

Third holographic optical element 43 receives the second image light emitted from second holographic optical element 42. Third holographic optical element 43 further deflects by diffraction the second image light that has been deflected by diffraction in second holographic optical element 42, and emits third image light (deflected light) to the outside of light guide 30, the third image light being obtained as a result of the deflection. Specifically, the second image light that has passed through second holographic optical element 42 enters into (passes through) third holographic optical element 43. Each time third holographic optical element 43 receives the second image light, third holographic optical element 43 emits third image light at a predetermined emission angle, the third image light being obtained as a result of the received second image light being further deflected by diffraction. More specifically, third holographic optical element 43 further deflects by diffraction the second image light according to the diffraction efficiency of third holographic optical element 43 while the second image light that has been deflected by diffraction in second holographic optical element 42 is propagating through light guide 30 in the Y axis minus direction. At this time, third holographic optical element 43 further stretches, in the generally Y axis direction, the image represented by the second image light that has been stretched in the X axis direction. By doing so, third holographic optical element 43 emits the third image light, which has been stretched in the X axis direction and the generally Y axis direction, to the outside of light guide 30 at a predetermined emission angle. That is, third holographic optical element 43 further stretches, in the generally Y axis direction, the second image light emitted from second holographic optical element 42, and thereby emits the third image light that has been enlarged in the X axis direction and the Y axis direction at a predetermined emission angle. In the present embodiment, third holographic optical element 43 emits the third image light to windshield 3 in the Z axis plus direction.

As used herein, the term "predetermined emission angle" refers to the emission angle of the third image light emitted from third holographic optical element 43, and the angle of light emitted with respect to a normal line of the light-emitting surface of third holographic optical element 43.

Next, the diffraction efficiency and the intensity distribution of image light diffracted by and emitted from each holographic optical element 40 will be described with reference to FIG. 4.

FIG. 4 is a diagram showing holographic optical elements 40 included in the display device according to the embodiment and the diffraction efficiency of each of holographic optical elements 40. (a) in FIG. 4 shows first holographic optical element 41 and the diffraction efficiency of first holographic optical element 41. (b) in FIG. 4 shows second holographic optical element 42 and the diffraction efficiency of second holographic optical element 42. (c) in FIG. 4 shows third holographic optical element 43 and the diffraction efficiency of third holographic optical element 43.

The diffraction efficiency of each holographic optical element 40 is smaller in edge portions of holographic optical element 40 than in a center portion of holographic optical element 40. For this reason, in an intensity distribution of the image light diffracted by and emitted from holographic optical element 40, the intensity is smaller in end portions than in an intermediate portion. The center portion encompasses first center portion 41*a*, second center portion 42*a*, and third center portion 43*a*. The edge portions encompass first edge portions 41*b*, second edge portions 42*b*, and third edge portions 43*b*. The intermediate portion encompasses a first intermediate portion, a second intermediate portion, and a third intermediate portion, which will be described below. The end portions encompass first end portions, second end portions, and a third end portion, which will be described below.

Specifically, as shown in (a) in FIG. 4, first holographic optical element 41 includes first center portion 41*a* and a pair of first edge portions 41*b*, wherein one of the pair of first edge portions 41*b*, first center portion 41*a*, and the other one of the pair of first edge portions 41*b* are arranged in order in the X axis direction. Width a1 is the same as a length of first holographic optical element 41 in the X axis direction. As shown in (c) in FIG. 3, and (a) in FIG. 4, when first holographic optical element 41 is viewed in the Y axis direction, the diffraction efficiency of first holographic optical element 41 is smaller in first edge portions 41*b* of first holographic optical element 41 than in first center portion 41*a* of first holographic optical element 41.

In first holographic optical element 41 described above, as shown in (a1) in FIG. 4, an intensity distribution of the first image light deflected by diffraction and emitted from first holographic optical element 41 includes a first intermediate portion and a pair of first end portions that are located on opposite sides of the first intermediate portion. Also, the first intermediate portion of the intensity distribution and the pair of first end portions of the intensity distribution are arranged in a first direction that is parallel to a direction in which the emitted first image light propagates through light guide member 31. In the intensity distribution of the first image light diffracted by and emitted from first holographic optical element 41, the intensity is smaller in the first end portions of the intensity distribution than in the first intermediate portion of the intensity distribution. That is, first holographic optical element 41 can emit the first image light that has an intensity distribution that is nonuniform and in which the intensity is smaller in the pair of first end portions of the intensity distribution than in the first intermediate portion of the intensity distribution. The X axis direction is an example of the first direction.

Also, as shown in (b) in FIG. 4, second holographic optical element 42 includes second center portion 42*a* and a pair of second edge portions 42*b*, wherein one of the pair of second edge portions 42*b*, second center portion 42*a*, and the other one of the pair of second edge portions 42*b* are arranged in order in the Y axis direction. Width a2 is the same as a length of second holographic optical element 42 in the Y axis direction. As shown in (b) in FIG. 3 and (b) in FIG. 4, when second holographic optical element 42 is viewed in the X axis direction, in the diffraction efficiency of second holographic optical element 42, the intensity is smaller in second edge portions 42*b* of second holographic optical element 42 than in second center portion 42*a* of second holographic optical element 42.

In second holographic optical element 42 described above, as shown in (b1) in FIG. 4, an intensity distribution of the second image light deflected by diffraction and emitted from second holographic optical element 42 includes a second intermediate portion and a pair of second end portions that are located on opposite sides of the second intermediate portion. Also, the second intermediate portion of the intensity distribution and the pair of second end portions of the intensity distribution are arranged in a second direction that is parallel to a direction in which the emitted second image light propagates through light guide member 31. Also, in the intensity distribution of the second image light diffracted by and emitted from second holographic optical element 42, the intensity is smaller in the pair of second end portions of the intensity distribution than in the second intermediate portion of the intensity distribution. That is, second holographic optical element 42 can emit the second image light that has an intensity distribution that is nonuniform and in which the intensity is smaller in the pair of second end portions of the intensity distribution than in the second intermediate portion of the intensity distribution. The Y axis direction is an example of the second direction.

Also, as shown in (c) in FIG. 4, third holographic optical element 43 includes third center portion 43*a* and a pair of third edge portions 43*b*, wherein one of the pair of third edge portions 43*b*, third center portion 43*a*, and the other one of the pair of third edge portions 43*b* are arranged in the Y axis direction, and the same applies in the X axis direction. That is, in third holographic optical element 43, outer edges of third holographic optical element 43 that surround third center portion 43*a* are formed by third edge portions 43*b*. Width a3 is the same as a length of third holographic optical element 43 in the Y axis direction, and is also the same as a length of third holographic optical element 43 in the X axis direction. Width a3 may be the same as the length of third holographic optical element 43 in the Y axis direction or the length of third holographic optical element 43 in the X axis direction. As shown in (a) in FIG. 3 and (c) in FIG. 4, when third holographic optical element 43 is viewed in the X axis direction, or when third holographic optical element 43 is viewed in the Y axis direction, in the diffraction efficiency of third holographic optical element 43, the intensity is smaller in third edge portions 43*b* of third holographic optical element 43 than in third center portion 43*a* of third holographic optical element 43.

In third holographic optical element 43 described above, as shown in (c1) in FIG. 4, an intensity distribution of the third image light deflected by diffraction in and emitted from third holographic optical element 43 includes a third intermediate portion and a third end portion that is located to surround the third intermediate portion. Also, in the intensity distribution of the third image light diffracted by and emitted from third holographic optical element 43, the intensity is smaller in the third end portion of the intensity distribution than in the third intermediate portion of the intensity distribution. That is, third holographic optical element 43 can emit the third image light that has an intensity distribution that is nonuniform and in which the intensity is smaller in the third end portion of the intensity distribution than in the third intermediate portion of the intensity distribution.

Also, the intensity distribution of the first image light diffracted by and emitted from first holographic optical element 41, the intensity distribution of the second image light diffracted by and emitted from second holographic optical element 42, and the intensity distribution of the third image light diffracted by and emitted from third holographic optical element 43 are different from each other.

Also, at least one of the intensity distribution of first holographic optical element 41 in the first direction, the intensity distribution of second holographic optical element 42 in the second direction, and the intensity distribution of third holographic optical element 43 in the first direction and the second direction has a trapezoidal shape, a triangular shape, a semicircular shape, or a stepped shape. In the present embodiment, the intensity distribution of first holographic optical element 41, the intensity distribution of second holographic optical element 42, and the intensity distribution of third holographic optical element 43 have a trapezoidal shape. At this time, image light emitter 50 may emit the image light whose intensity distribution has a trapezoidal shape, a triangular shape, or a semicircular shape according to the distribution of the diffraction efficiency of holographic optical element 40.

Next, intensity distributions of image light emitted from light guide 30 according to the angle of view will be described with reference to FIGS. 5A to 6C.

Figures 5A, 5B:
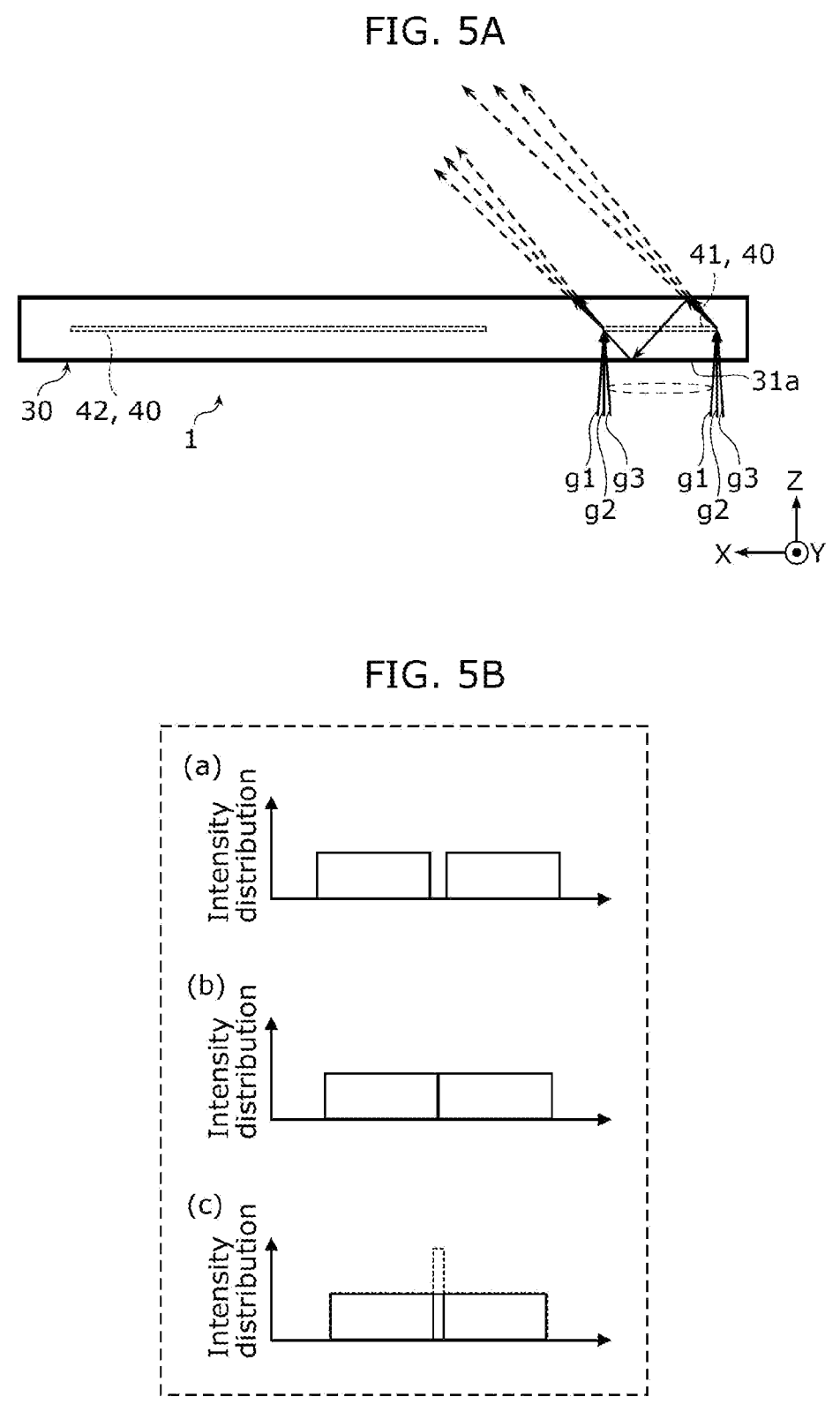
Figure 5C:
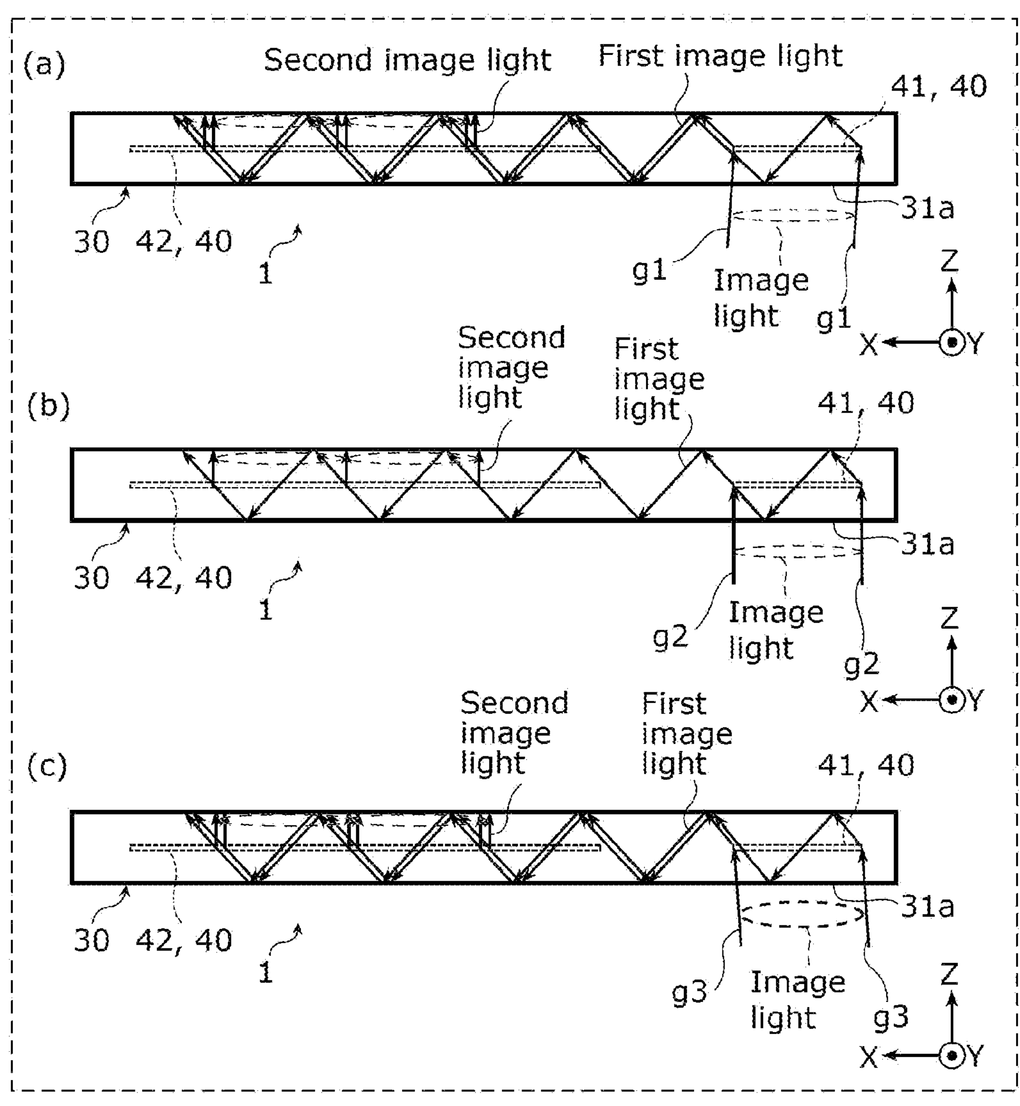
FIG. 5C is a diagram illustrating second image light emitted from the first holographic optical element when image light rays with different angles of view enter into a second holographic optical element.
Figure 6A:
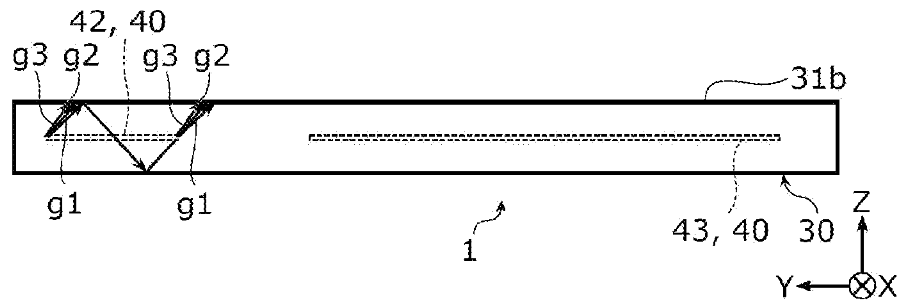
FIG. 6A is a diagram illustrating second image light emitted from the second holographic optical element when first image light rays with different angles of view enter into the second holographic optical element.
Figure 6B:
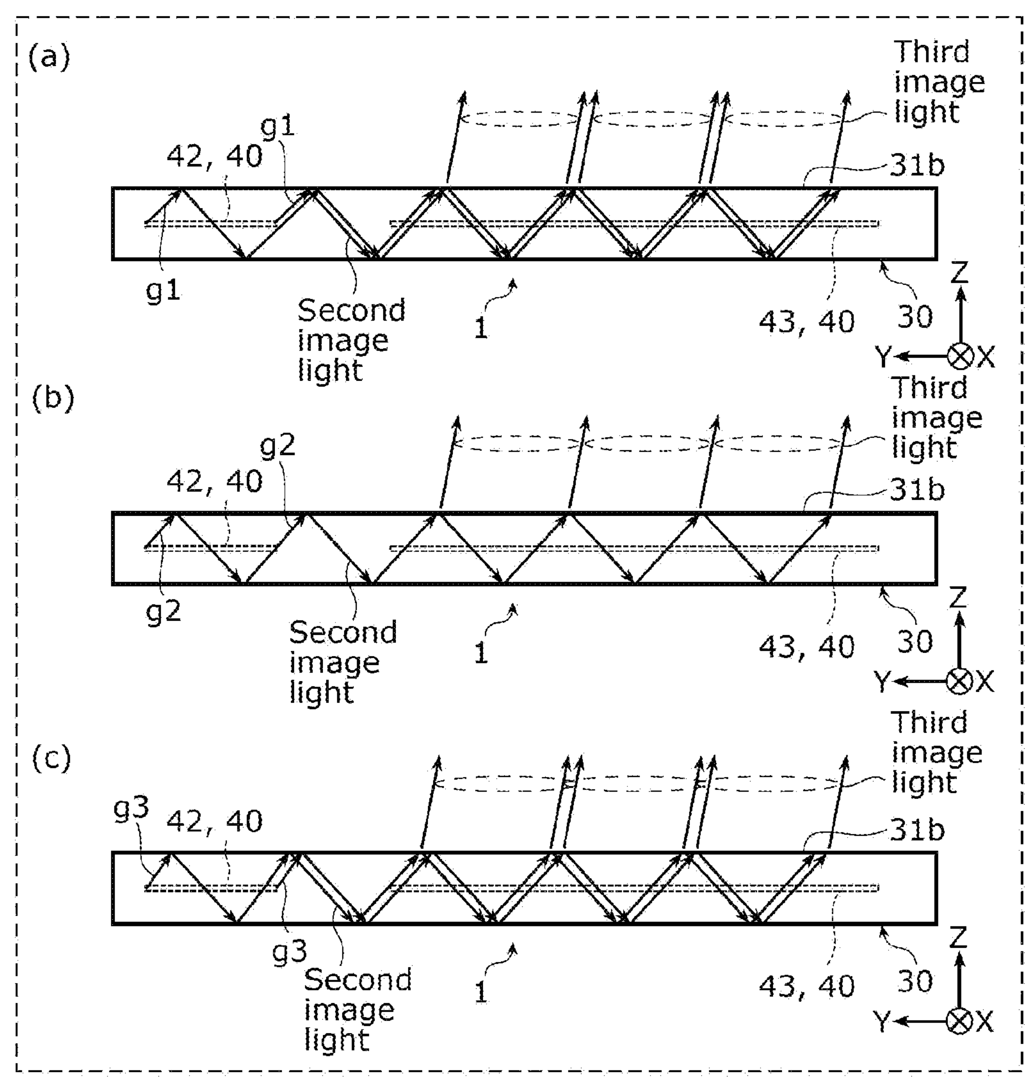
FIG. 6B is a diagram illustrating third image light emitted from a third holographic optical element when first image light rays with different angles of view enter into the second holographic optical element.
Figure 6C:
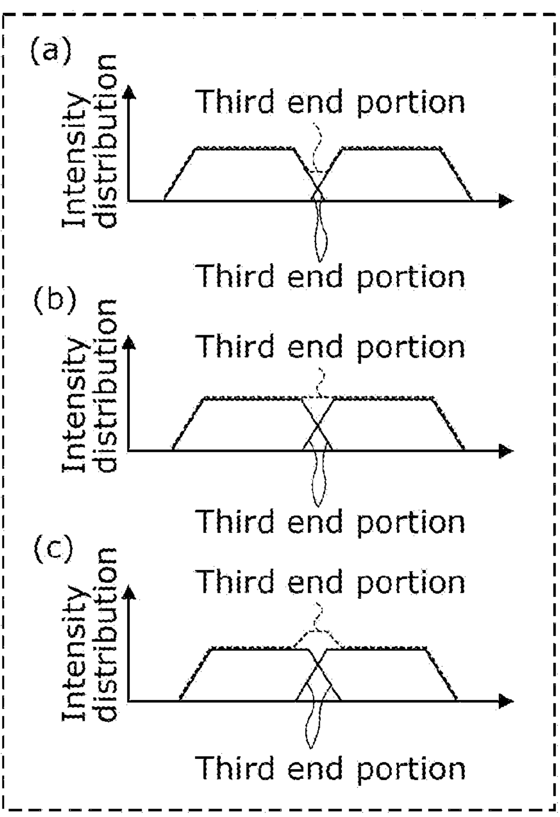
FIG. 6C shows intensity distributions of third image light emitted from the third holographic optical element when second image light rays with different angles of view enter into the third holographic optical element.

FIG. 5A is a diagram illustrating first image light emitted from first holographic optical element 41 when image light rays with different angles of view enter into first holographic optical element 41. FIG. 5B shows intensity distributions according to a comparative example. FIG. 5C is a diagram illustrating second image light emitted from second holographic optical element 42 when image light rays with different angles of view enter into first holographic optical element 41. FIG. 6A is a diagram illustrating second image light emitted from second holographic optical element 42 when first image light rays with different angles of view enter into second holographic optical element 42. FIG. 6B is a diagram illustrating third image light emitted from third holographic optical element 43 when first image light rays with different angles of view enter into second holographic optical element 42. FIG. 6C shows intensity distributions of third image light emitted from third holographic optical element 43 when second image light rays with different angles of view enter into third holographic optical element 43. Also, (a) in FIG. 5B shows an example in which image light with angle of view g1 enters light-entering surface 31*a*. (b) in FIG. 5B shows an example in which image light with angle of view g2 enters light-entering surface 31*a*. (c) in FIG. 5B shows an example in which image light with angle of view g3 enters light-entering surface 31*a*. The same applies to (a), (b), and (c) in FIGS. 5C, 6B, and 6C.

As shown in FIG. 5A, the image light emitted from image light emitter 50 enters light-entering surface 31*a* of light guide 30. However, the angle of image light that enters light-entering surface 31*a* varies depending on the difference in the angle of view. For example, the image light with angle of view g1, the image light with angle of view g2, and the image light with angle of view g3 enter light-entering surface 31*a*.

As shown in FIG. 5B, in the comparative example, a first holographic optical element, a second holographic optical element, and a third holographic optical element that have a uniform diffraction efficiency are used. For this reason, an intensity distribution of the first holographic optical element, an intensity distribution of the second holographic optical element in the second direction, and an intensity distribution of the third holographic optical element in the first direction and the second direction have a rectangular shape.

In this case, as shown in (a) in FIG. 5B, when the image light that has entered the first holographic optical element at angle of view g1 is emitted from the third holographic optical element as third image light, the intensity distribution shifts, and a gap is formed between intensity distributions of two adjacent third image light rays. For this reason, when the third image light is projected onto the windshield, dark streaks appear in the image.

Also, as shown in (b) in FIG. 5B, when the image light that has entered the first holographic optical element at angle of view g2 is emitted from the third holographic optical element as third image light, no gap is formed between intensity distributions of two adjacent third image light rays. For this reason, when the third image light is projected onto the windshield, the image appears appropriately.

Also, as shown in (c) in FIG. 5B, when the image light that has entered the first holographic optical element at angle of view g3 is emitted from the third holographic optical element as third image light, the intensity distribution shifts, and intensity distributions of two adjacent third image light rays partially overlap each other. For this reason, as indicated by a broken line, the third image light rays reinforce each other. Accordingly, when the third image light is projected onto the windshield, bright streaks appear in the image.

As described above, in the comparative example, bright streaks or dark streaks appear in the image projected onto the windshield, which reduces visibility.

However, in the present embodiment, as shown in (a) in FIG. 5C, when image light with angle of view g1 enters light-entering surface 31*a*, the image light with angle of view g1 enters into first holographic optical element 41, and the image light with angle of view g1 is deflected by diffraction in first holographic optical element 41 and transformed into first image light with angle of view g1, and then emitted to second holographic optical element 42.

As shown in FIG. 6A and (a) in FIG. 6B, the first image light with angle of view g1 that has entered into second holographic optical element 42 is deflected by diffraction in second holographic optical element 42 and transformed into second image light with angle of view g1, and then emitted to third holographic optical element 43.

The second image light with angle of view g1 that has entered into third holographic optical element 43 is deflected by diffraction in third holographic optical element 43 and transformed into third image light with angle of view g1, and then emitted to windshield 3.

When third holographic optical element 43 emits the third image light to windshield 3, as shown in (a) in FIG. 6C, the intensity distribution of the third image light with angle of view g1 shifts, and intensity distributions of two adjacent third image light rays overlap at third end portions, and thus the third image light rays with angle of view g1 are reinforced each other as indicated by a broken line. In this case as well, dark streaks that appear in the image when the third image light is projected onto windshield 3 are suppressed as compared with the example shown in (a) in FIG. 5B. For this reason, in the present embodiment, dark streaks can be reduced to an unnoticeable level.

Next, as shown in (b) in FIG. 5C, when the image light with angle of view g2 enters light-entering surface 31*a*, the image light with angle of view g2 enters into first holographic optical element 41. The image light with angle of view g2 is deflected by diffraction in first holographic optical element 41 and transformed into first image light with angle of view g2, and then emitted to second holographic optical element 42.

As shown in FIG. 6A and (b) in FIG. 6B, the first image light with angle of view g2 that has entered into second holographic optical element 42 is deflected by diffraction in second holographic optical element 42 and transformed into second image light with angle of view g2, and then emitted to third holographic optical element 43.

The second image light with angle of view g2 that has entered into third holographic optical element 43 is deflected by diffraction in third holographic optical element 43 and transformed into third image light with angle of view g2, and then emitted to windshield 3.

When third holographic optical element 43 emits the third image light to windshield 3, as shown in (b) in FIG. 6C, intensity distributions of two adjacent third image light rays overlap at third end portions, and thus the third image light rays with angle of view g2 are reinforced each other as indicated by a broken line. In this case, when the third image light is projected onto windshield 3, the image appropriately appears.

Next, as shown in (c) in FIG. 5C, when the image light with angle of view g3 enters light-entering surface 31*a*, the image light with angle of view g3 enters into first holographic optical element 41. Then, the image light with angle of view g3 is deflected by diffraction in first holographic optical element 41 and transformed into first image light with angle of view g3, and then emitted to second holographic optical element 42.

As shown in FIG. 6A and (c) in FIG. 6B, the first image light with angle of view g3 that has entered into second holographic optical element 42 is deflected by diffraction in second holographic optical element 42 and transformed into second image light with angle of view g3, and then emitted to third holographic optical element 43.

The second image light with angle of view g3 that has entered into third holographic optical element 43 is deflected by diffraction in third holographic optical element 43 and transformed into third image light with angle of view g3, and then emitted to windshield 3.

When third holographic optical element 43 emits the third image light to windshield 3, as shown in (c) in FIG. 6C, the intensity distribution of the third image light with angle of view g3 shifts, intensity distributions of two adjacent third image light rays overlap at third end portions, and the third image light rays with angle of view g3 are reinforced each other as indicated by a broken line. In this case, bright streaks that appear in the image when the third image light is projected onto windshield 3 are suppressed as compared with the example shown in (c) in FIG. 5B. For this reason, in the present embodiment, bright streaks can be reduced to an unnoticeable level.

Operational Advantage

Next, a description will be given of operational advantages of light guide 30 according to the present embodiment.

In an optical device according to conventional technology, when light diffracted by a volume hologram diffraction grating propagates through the optical device, the propagation angle may vary according to the viewing angle, and the distance by which the emitted light shifts may vary during a period in which the light reciprocates once in the thickness direction of the light guide plate. At this time, the light rays emitted from the light guide plate may partially overlap each other, or may not overlap each other. Accordingly, when the light emitted from the optical device is projected onto a display medium, bright streaks or dark streaks may appear, which reduces the image quality.

To address this, as described above, light guide 30 according to the present embodiment includes: holographic optical element 40 that receives image light emitted from image light emitter 50; and light guide member 31 that includes holographic optical element 40, wherein, in an intensity distribution of the image light diffracted by and emitted from holographic optical element 40, intensity is smaller in an end portion of the intensity distribution than in an intermediate portion of the intensity distribution.

For example, the image light repeatedly enters into the holographic optical element, and thus each time the holographic optical element receives the image light, the holographic optical element deflects by diffraction the image light, and emits the deflected image light. As in the comparative example, in the case where the intensity distribution of image light deflected by diffraction in a holographic optical element is constant (has a rectangular shape), as shown in FIG. 5B, two adjacent image light rays deflected by diffraction by and emitted from the holographic optical element may partially overlap each other, or may not overlap each other. As a result, noise may be generated due to bright streaks or dark streaks appearing in the image light emitted from the light guide, which reduces visibility.

However, according to the present embodiment, holographic optical element 40 can emit image light that has an intensity distribution that is nonuniform and in which the intensity is smaller in an end portion of the intensity distribution than in an intermediate portion of the intensity distribution.

Also, when image light repeatedly enters into holographic optical element 40, even if two adjacent image light rays diffracted by and emitted from holographic optical element 40 partially overlap each other, as shown in FIG. 6C, the degree of bright streaks and dark streaks that appear in the image light emitted from light guide 30 can be suppressed.

Also, the image light that has an intensity distribution in which the intensity is smaller in an end portion of the intensity distribution than in an intermediate portion of the intensity distribution can also be caused to enter into another holographic optical element 40. Accordingly, when image light repeatedly enters into another holographic optical element 40, even if two adjacent image light rays diffracted by and emitted from another holographic optical element 40 partially overlap each other, the degree of bright streaks and dark streaks that appear in the image light emitted from light guide 30 can be suppressed.

Accordingly, in the present embodiment, the quality of images projected onto the display medium (windshield 3) can be improved.

Also, display device 1 according to the present embodiment includes light guide 30 and image light emitter 50 that outputs image light to light guide 30.

With display device 1 as well, the same operational advantages as described above can be obtained.

Also, in light guide 30 according to the present embodiment, holographic optical element 40 includes: first holographic optical element 41 that receives the image light; and second holographic optical element 42 that receives the image light. An intensity distribution of the image light diffracted by and emitted from first holographic optical element 41 is different from an intensity distribution of the image light diffracted by and emitted from second holographic optical element 42.

With this configuration, it is possible to suppress the overlap of noise contained in the image light (first image light) emitted from first holographic optical element 41 and noise contained in the image light (second image light)

emitted from second holographic optical element 42. Because noise generated in the image light (third image light) emitted from light guide member 31 can be suppressed, the image quality can be improved.

Also, in light guide 30 according to the present embodiment, first holographic optical element 41 and second holographic optical element 42 are any two of the following holographic optical elements: a light-entering holographic optical element that receives the image light; a turning holographic optical element that receives the image light (first image light) emitted from the light-entering holographic optical element; and a light-emitting holographic optical element that receives the image light (second image light) emitted from the turning holographic optical element.

With this configuration, it is possible to suppress the overlap of noise contained in the image light rays emitted from any two of the light-entering holographic optical element, the turning holographic optical element, and the light-emitting holographic optical element. Because noise generated in the image light emitted from light guide member 31 can be suppressed, the image quality can be improved.

Also, in light guide 30 according to the present embodiment, holographic optical element 40 includes: first holographic optical element 41 that receives the image light; second holographic optical element 42 that receives the image light (first image light) emitted from first holographic optical element 41; and third holographic optical element 43 that receives the image light (second image light) emitted from second holographic optical element 42. An intensity distribution of the image light (first image light) diffracted by and emitted from first holographic optical element 41, an intensity distribution of the image light (second image light) diffracted by and emitted from second holographic optical element 42, and an intensity distribution of the image light (third image light) diffracted by and emitted from third holographic optical element 43 are different from each other.

With this configuration, it is possible to suppress the overlap of noise contained in the first image light emitted from first holographic optical element 41, noise contained in the second image light emitted from second holographic optical element 42, and noise contained in the third image light emitted from third holographic optical element 43. Because noise generated in the third image light emitted from light guide member 31 can be suppressed, the image quality can be improved.

Also, in light guide 30 according to the present embodiment, first holographic optical element 41 is a light-entering holographic optical element that receives the image light, second holographic optical element 42 is a turning holographic optical element that receives the image light (first image light) emitted from the light-entering holographic optical element, and third holographic optical element 43 is a light-emitting holographic optical element that receives the image light (second image light) emitted from the turning holographic optical element.

With this configuration, it is possible to suppress the overlap of noise contained in the image light emitted from the light-entering holographic optical element, noise contained in the image light emitted from the turning holographic optical element, and noise contained in the image light emitted from the light-emitting holographic optical element. Because noise generated in the image light emitted from light guide member 31 can be suppressed, the image quality can be improved.

Also, in light guide 30 according to the present embodiment, an intensity distribution of the image light (first image light) diffracted by and emitted from the light-entering holographic optical element includes a first intermediate portion and a pair of first end portions that are located on opposite sides of the first intermediate portion. Also, the first intermediate portion and the pair of first end portions are arranged in a first direction that is parallel to a direction in which the emitted image light (first image light) propagates through light guide member 31. In the intensity distribution of the image light (first image light) diffracted by and emitted from the light-entering holographic optical element, the intensity is smaller in the pair of first end portions of the intensity distribution than in the first intermediate portion of the intensity distribution.

With this configuration, the light-entering holographic optical element can emit image light that has an intensity distribution that is nonuniform and in which the intensity is smaller in the pair of first end portions of the intensity distribution than in the first intermediate portion of the intensity distribution.

Also, the image light whose intensity distribution is nonuniform can also be caused to enter into another holographic optical element 40, and thus when the image light repeatedly enters into another holographic optical element 40, even if two adjacent image light rays diffracted by and emitted from another holographic optical element 40 partially overlap each other, the degree of bright streaks and dark streaks that appear in the image light emitted from light guide 30 can be suppressed.

Also, in light guide 30 according to the present embodiment, an intensity distribution of the image light (second image light) diffracted by and emitted from the turning holographic optical element includes a second intermediate portion and a pair of second end portions that are located on opposite sides of the second intermediate portion. Also, the second intermediate portion and the pair of second end portions are arranged in a second direction that is parallel to a direction in which the emitted image light (second image light) propagates through light guide member 31. In the intensity distribution of the image light (second image light) diffracted by and emitted from the turning holographic optical element, the intensity is smaller in the pair of second end portions of the intensity distribution than in the second intermediate portion of the intensity distribution.

With this configuration, when the first image light is reflected by light guide member 31 and repeatedly enters into the turning holographic optical element, even if two adjacent image light rays (second image light) diffracted by and emitted from the turning holographic optical element partially overlap each other, the degree of bright streaks and dark streaks that appear in the image light (third image light) emitted from light guide 30 can be suppressed.

Also, the image light (second image light) that has an intensity distribution in which the intensity is smaller in the end portions than in the intermediate portion to enter into the light-emitting holographic optical element. Accordingly, when the image light (second image light) repeatedly enters into the light-emitting holographic optical element, even if two adjacent image light rays (second image light) diffracted by and emitted from the light-emitting holographic optical element partially overlap each other, the degree of bright streaks and dark streaks that appear in the image light (second image light) emitted from light guide 30 can be suppressed.

Also, in light guide 30 according to the present embodiment, an intensity distribution of the image light diffracted by and emitted from the light-emitting holographic optical element includes a third intermediate portion and a third end portion that is located to surround the third intermediate portion. In the intensity distribution of the image light diffracted by and emitted from the light-emitting holographic optical element, the intensity is smaller in the third end portion of the intensity distribution than in the third intermediate portion of the intensity distribution.

With this configuration, in a displayed image, the brightness of the displayed image decreases gradually from the third intermediate portion to the third end portion without the displayed image being abruptly interrupted. Accordingly, the boundary of the display range limit is unlikely to be visually recognized, and thus the quality of the displayed image can be improved.

Also, in light guide 30 according to the present embodiment, holographic optical element 40 includes at least two of the following holographic optical elements: a light-entering holographic optical element that receives the image light; a turning holographic optical element that receives the image light (first image light) emitted from the light-entering holographic optical element; and a light-emitting holographic optical element that receives the image light (second image light) emitted from the turning holographic optical element. Also, an intensity distribution of the image light (first image light) diffracted by and emitted from the light-entering holographic optical element includes a first intermediate portion and a pair of first end portions that are located on opposite sides of the first intermediate portion. Also, the first intermediate portion and the pair of first end portions are arranged in a first direction that is parallel to a direction in which the emitted image light (first image light) propagates through light guide member 31. Also, an intensity distribution of the image light (second image light) diffracted by and emitted from the turning holographic optical element includes a second intermediate portion and a pair of second end portions that are located on opposite sides of the second intermediate portion. Also, the second intermediate portion and the pair of second end portions are arranged in a second direction that is parallel to a direction in which the emitted image light (second image light) propagates through light guide member 31. Also, an intensity distribution of the image light (third image light) diffracted by and emitted from the light-emitting holographic optical element includes a third intermediate portion and a third end portion that is located to surround the third intermediate portion. Also, in the intensity distribution of the image light (first image light) diffracted by and emitted from the light-entering holographic optical element, the intensity is smaller in the pair of first end portions of the intensity distribution than in the first intermediate portion of the intensity distribution. Also, in the intensity distribution of image light (second image light) diffracted by and emitted from the turning holographic optical element, the intensity is smaller in the pair of second end portions of the intensity distribution than in the second intermediate portion of the intensity distribution. Also, in the intensity distribution of image light (third image light) diffracted by and emitted from the light-emitting holographic optical element, the intensity is smaller in the third end portion of the intensity distribution than in the third intermediate portion of the intensity distribution.

With this configuration, each holographic optical element 40 emits image light that has an intensity distribution that is nonuniform and in which the intensity is smaller in an end portion of the intensity distribution than in an intermediate portion of the intensity distribution. For this reason, even if two adjacent image light rays partially overlap each other, the degree of bright streaks and dark streaks that appear in the image light emitted from light guide 30 can be suppressed.

Also, in light guide 30 according to the present embodiment, at least one of the intensity distribution of the light-entering holographic optical element in the first direction, the intensity distribution of the turning holographic optical element in the second direction, and the intensity distribution of the light-emitting holographic optical element in the first direction and the second direction has a trapezoidal shape, a triangular shape, a semicircular shape, or a stepped shape.

With this configuration, it is possible to suppress noise generated in the image emitted from light guide member 31 and projected onto the display medium, and thus the image quality can be improved.

Also, in light guide 30 according to the present embodiment, image light emitter 50 emits the image light whose intensity distribution has a trapezoidal shape, a triangular shape, or a semicircular shape according to a distribution of diffraction efficiency of holographic optical element 40.

With this configuration, it is possible to suppress noise generated in the image emitted from light guide member 31 and projected onto the display medium, and thus the image quality can be improved.

Variation of Embodiment

First, a configuration of display device **1*a* according to a variation of the embodiment will be described with reference to FIG. 7**.

Figure 7:
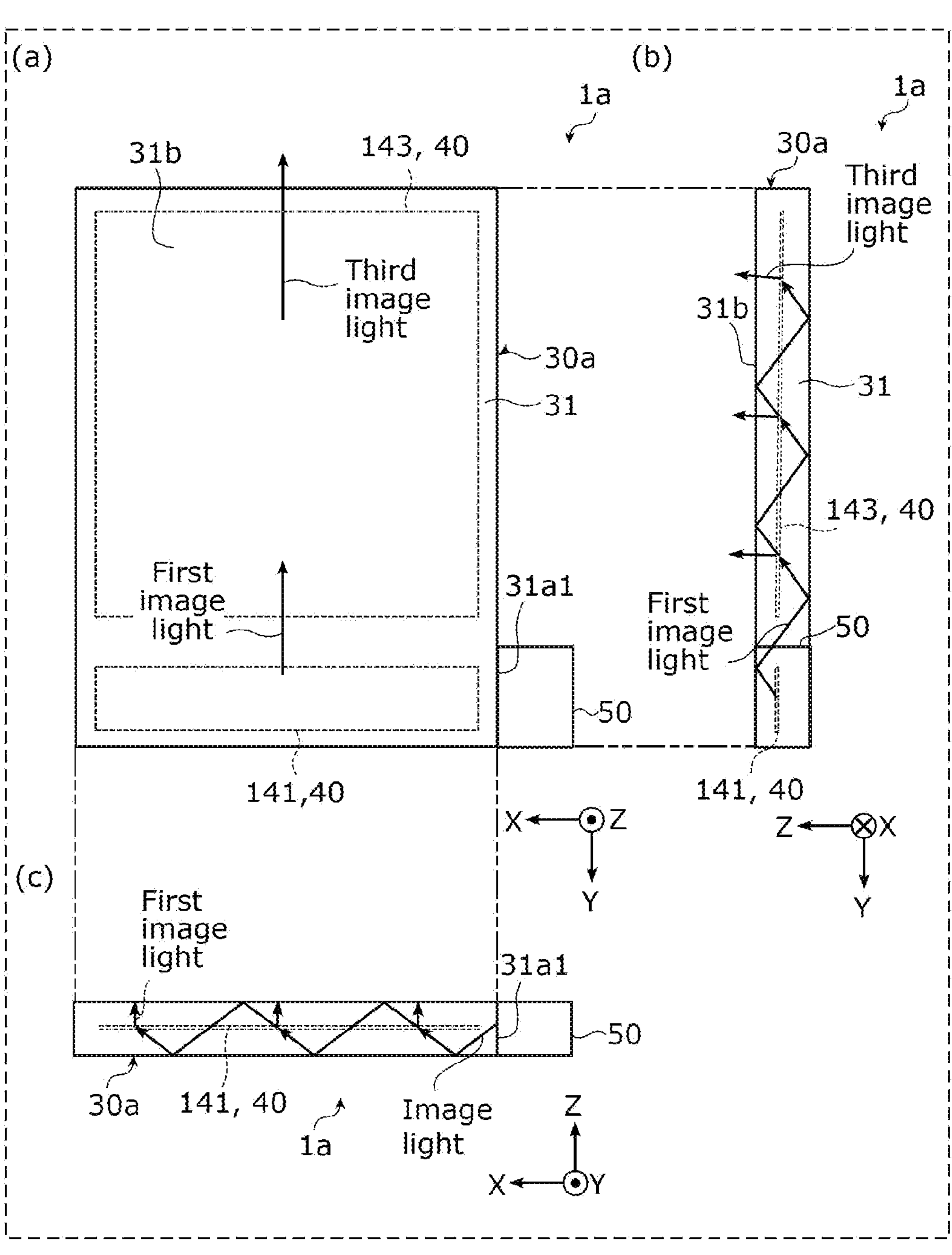
FIG. 7 is a diagram showing a display device according to a variation of the embodiment.

FIG. 7 is a diagram showing display device **1*a*** according to the variation of the embodiment.

The present variation is different from the embodiment in that two holographic optical elements 40 are used. Other structural elements of the present variation are the same as those of the embodiment unless otherwise noted. The same structural elements are given the same reference numerals, and a detailed description thereof will be omitted.

Light guide **30*a* includes light-transmitting light guide member 31 and a plurality of holographic optical elements 40**.

The plurality of holographic optical elements 40 include two holographic optical elements.

The two holographic optical elements may be any two of the following holographic optical elements: a light-entering holographic optical element that receives image light; a turning holographic optical element that receives the image light emitted from the light-entering holographic optical element; and a light-emitting holographic optical element that receives the image light emitted from the turning holographic optical element. As described above, the plurality of holographic optical elements 40 may include at least two of the following holographic optical elements: a light-entering holographic optical element that receives image light; a turning holographic optical element that receives the image light; and a light-emitting holographic optical element that receives the image light.

Light guide **30*a* of the present embodiment includes light-entering holographic optical element 141 and light-emitting holographic optical element 143 as an example of the plurality of holographic optical elements 40**.

Light-entering holographic optical element 141 and light-emitting holographic optical element 143 are arranged in the Y axis direction. Also, light-entering holographic optical element 141 is provided to overlap image light emitter 50 as viewed in the X axis direction.

Image light emitter 50 is provided on an end face of light guide 30*a* such that image light emitter 50 can emit light in a direction in which light-entering holographic optical element 141 elongated in the X axis direction extends. As used herein, the term "an end face of light guide 30*a*" refers to a side face of light guide 30*a*, and specifically light-entering surface 31*a*1 of light guide 30*a* that is located on the X axis minus direction side relative to light-entering holographic optical element 141.

Light-entering holographic optical element 141 receives image light that has been emitted from image light emitter 50 and travelled in the X axis plus direction. Light-entering holographic optical element 141 emits the received image light to light-emitting holographic optical element 143. Specifically, light-entering holographic optical element 141 emits first image light (deflected light) to light-emitting holographic optical element 143, the first image light being obtained as a result of the image light that has been emitted from image light emitter 50 and entered through light-entering surface 31*a*1 being deflected. More specifically, light-entering holographic optical element 141 deflects by diffraction the image light according to the diffraction efficiency of light-entering holographic optical element 141 while the image light that has entered into light guide 30*a* is propagating through light guide 30*a*. At this time, light-entering holographic optical element 141 stretches the image represented by the first image light in the X axis direction. By doing so, light-entering holographic optical element 141 emits the first image light stretched in the X axis direction as first image light that propagates in the Y axis minus direction. The first image light deflected by diffraction in light-entering holographic optical element 141 enters into light-emitting holographic optical element 143.

Light-emitting holographic optical element 143 receives the first image light emitted from light-entering holographic optical element 141. Light-emitting holographic optical element 143 emits third image light (deflected light) to the outside of light guide 30*a*, the third image light being obtained as a result of the first image light deflected by diffraction in light-entering holographic optical element 141 being further deflected by diffraction. Specifically, the first image light that has passed through light-entering holographic optical element 141 enters into (passes through) light-emitting holographic optical element 143. Each time light-emitting holographic optical element 143 receives the first image light, light-emitting holographic optical element 143 emits third image light at a predetermined emission angle, the third image light being obtained as a result of the received first image light being further diffracted by diffraction. More specifically, light-emitting holographic optical element 143 further deflects by diffraction the first image light according to the diffraction efficiency of light-emitting holographic optical element 143 while the first image light that has been deflected by diffraction in light-entering holographic optical element 141 is propagating through light guide 30*a* in the Y axis minus direction. At this time, light-emitting holographic optical element 143 further stretches, in the generally Y axis direction, the image represented by the first image light that has been stretched in the X axis direction. By doing so, light-emitting holographic optical element 143 emits the third image light, which has been stretched in the X axis direction and the generally Y axis direction, to the outside of light guide 30*a* at a predetermined emission angle. That is, light-emitting holographic optical element 143 further stretches, in the generally Y axis direction, the first image light emitted from light-entering holographic optical element 141, and thereby emits the third image light that has been enlarged in the X axis direction and the Y axis direction at a predetermined emission angle. In the present embodiment, light-emitting holographic optical element 143 emits the third image light to windshield 3 in the Z axis plus direction.

Other Variations

The light guide and the display device according to the present disclosure have been described above by way of the embodiment, but the present disclosure is not limited to the embodiment given above. Other embodiments obtained by making various modifications that can be conceived by a person having ordinary skill in the art to the above embodiment may also be included within the scope of the present disclosure without departing from the scope of the present disclosure.

The present disclosure also encompasses other embodiments obtained by making various modifications that can be conceived by a person having ordinary skill in the art to the above embodiment as well as embodiments implemented by any combination of the structural elements and the functions of the above embodiment without departing from the scope of the present disclosure.

Additional Statements

The features of the light guide and the display device described based on the embodiment above are given below.

Technique 1

A light guide comprising:

a holographic optical element that receives image light emitted from an image light emitter; and a light guide member that includes the holographic optical element, wherein, in an intensity distribution of the image light diffracted by and emitted from the holographic optical element, intensity is smaller in an end portion of the intensity distribution than in an intermediate portion of the intensity distribution.

Technique 2

The light guide according to technique 1, wherein the holographic optical element includes: a first holographic optical element that receives the image light; and a second holographic optical element that receives the image light, and an intensity distribution of the image light diffracted by and emitted from the first holographic optical element is different from an intensity distribution of image light diffracted by and emitted from the second holographic optical element.

Technique 3

The light guide according to technique 2, wherein the first holographic optical element and the second holographic optical element are any two of the following holographic optical elements: a light-entering holographic optical element that receives the image light; a turning holographic optical element that receives the image light emitted from the light-entering holographic optical element; and a light-emitting holographic optical element that receives the image light emitted from the turning holographic optical element.

Technique 4

The light guide according to any one of techniques 1 to 3, wherein the holographic optical element includes: a first holographic optical element that receives the image light; a second holographic optical element that receives the image light emitted from the first holographic optical element; and a third holographic optical element that receives the image light emitted from the second holographic optical element, and an intensity distribution of the image light diffracted by and emitted from the first holographic optical element, an intensity distribution of the image light diffracted by and emitted from the second holographic optical element, and an intensity distribution of the image light diffracted by and emitted from the third holographic optical element are different from each other.

Technique 5

The light guide according to technique 4, wherein the first holographic optical element is a light-entering holographic optical element that receives the image light, the second holographic optical element is a turning holographic optical element that receives the image light emitted from the light-entering holographic optical element, and the third holographic optical element is a light-emitting holographic optical element that receives the image light emitted from the turning holographic optical element.

Technique 6

The light guide according to technique 3 or 5, wherein an intensity distribution of the image light diffracted by and emitted from the light-entering holographic optical element includes a first intermediate portion and a pair of first end portions that are located on opposite sides of the first intermediate portion, the first intermediate portion and the pair of first end portions are arranged in a first direction that is parallel to a direction in which the image light emitted propagates through the light guide member, and in the intensity distribution of the image light diffracted by and emitted from the light-entering holographic optical element, intensity is smaller in the pair of first end portions of the intensity distribution than in the first intermediate portion of the intensity distribution.

Technique 7

The light guide according to technique 3 or 5, wherein an intensity distribution of the image light diffracted by and emitted from the turning holographic optical element includes a second intermediate portion and a pair of second end portions that are located on opposite sides of the second intermediate portion, the second intermediate portion and the pair of second end portions are arranged in a second direction that is parallel to a direction in which the image light emitted propagates through the light guide member, and in the intensity distribution of the image light diffracted by and emitted from the turning holographic optical element, intensity is smaller in the pair of second end portions of the intensity distribution than in the second intermediate portion of the intensity distribution.

Technique 8

The light guide according to technique 3 or 5, wherein an intensity distribution of the image light diffracted by and emitted from the light-emitting holographic optical element includes a third intermediate portion and a third end portion that is located to surround the third intermediate portion, and in the intensity distribution of the image light diffracted by and emitted from the light-emitting holographic optical element, intensity is smaller in the third end portion of the intensity distribution than in the third intermediate portion of the intensity distribution.

Technique 9

The light guide according to technique 1, wherein the holographic optical element includes at least two of the following holographic elements: a light-entering holographic optical element that receives the image light; a turning holographic optical element that receives the image light; and a light-emitting holographic optical element that receives the image light, an intensity distribution of the image light diffracted by and emitted from the light-entering holographic optical element includes a first intermediate portion and a pair of first end portions that are located on opposite sides of the first intermediate portion, the first intermediate portion and the pair of first end portions are arranged in a first direction that is parallel to a direction in which the image light emitted propagates through the light guide member, an intensity distribution of the image light diffracted by and emitted from the turning holographic optical element includes a second intermediate portion and a pair of second end portions that are located on opposite sides of the second intermediate portion, the second intermediate portion and the pair of second end portions are arranged in a second direction that is parallel to a direction in which the image light emitted propagates through the light guide member, an intensity distribution of the image light diffracted by and emitted from the light-emitting holographic optical element includes a third intermediate portion and a third end portion that is located to surround the third intermediate portion, in the intensity distribution of the image light diffracted by and emitted from the light-entering holographic optical element, intensity is smaller in the pair of first end portions of the intensity distribution than in the first intermediate portion of the intensity distribution, in the intensity distribution of the image light diffracted by and emitted from the turning holographic optical element, intensity is smaller in the pair of second end portions of the intensity distribution than in the second intermediate portion of the intensity distribution, in the intensity distribution of the image light diffracted by and emitted from the light-emitting holographic optical element, intensity is smaller in the third end portion of the intensity distribution than in the third intermediate portion of the intensity distribution.

Technique 10

The light guide according to technique 9, wherein at least one of the intensity distribution of the light-entering holographic optical element in the first direction, the intensity distribution of the turning holographic optical element in the second direction, or the intensity distribution of the light-emitting holographic optical element in the first direction and the second direction has a trapezoidal shape, a triangular shape, a semicircular shape, or a stepped shape.

Technique 11

A display device including:

the light guide according to any one of techniques 1 to 10; and the image light emitter that outputs the image light to the light guide.

Technique 12

The display device according to technique 11, wherein the image light emitter emits the image light whose intensity distribution has a trapezoidal shape, a triangular shape, or a semicircular shape according to a distribution of diffraction efficiency of the holographic optical element.

While an embodiment has been described herein above, it is to be appreciated that various changes in form and detail may be made without departing from the spirit and scope of the present disclosure as presently or hereafter claimed.

Further Information About Technical Background to This Application

The disclosure of the following patent application including specification, drawings, and claims are incorporated herein by reference in their entirety: Japanese Patent Application No. 2023-058861 filed on Mar. 31, 2023.

INDUSTRIAL APPLICABILITY

The present disclosure is applicable to a head-up display device used in a vehicle or the like.

The invention claimed is:

1. A light guide comprising:

a holographic optical element that receives image light emitted from an image light emitter; and a light guide member that includes the holographic optical element, wherein in an intensity distribution of the image light diffracted by and emitted from the holographic optical element, intensity is smaller in an end portion of the intensity distribution than in an intermediate portion of the intensity distribution, the holographic optical element includes: a first holographic optical element that receives the image light; and a second holographic optical element that receives the image light, an intensity distribution of the image light diffracted by and emitted from the first holographic optical element is different from an intensity distribution of image light diffracted by and emitted from the second holographic optical element, the first holographic optical element and the second holographic optical element are any two of the following holographic optical elements: a light-entering holographic optical element that receives the image light; a turning holographic optical element that receives the image light emitted from the light-entering holographic optical element; and a light-emitting holographic optical element that receives the image light emitted from the turning holographic optical element, an intensity distribution of the image light diffracted by and emitted from the light-entering holographic optical element includes a first intermediate portion and a pair of first end portions that are located on opposite sides of the first intermediate portion, the first intermediate portion and the pair of first end portions are arranged in a first direction that is parallel to a direction in which the image light emitted propagates through the light guide member, and in the intensity distribution of the image light diffracted by and emitted from the light-entering holographic optical element, intensity is smaller in the pair of first end portions of the intensity distribution than in the first intermediate portion of the intensity distribution.

2. The light guide according to claim 1, wherein the holographic optical element includes: the first holographic optical element that receives the image light; the second holographic optical element that receives the image light emitted from the first holographic optical element; and a third holographic optical element that receives the image light emitted from the second holographic optical element, and an intensity distribution of the image light diffracted by and emitted from the first holographic optical element, an intensity distribution of the image light diffracted by and emitted from the second holographic optical element, and an intensity distribution of the image light diffracted by and emitted from the third holographic optical element are different from each other.

3. The light guide according to claim 2, wherein the first holographic optical element is a light-entering holographic optical element that receives the image light, the second holographic optical element is a turning holographic optical element that receives the image light emitted from the light-entering holographic optical element, and the third holographic optical element is a light-emitting holographic optical element that receives the image light emitted from the turning holographic optical element.

4. The light guide according to claim 1, wherein an intensity distribution of the image light diffracted by and emitted from the turning holographic optical element includes a second intermediate portion and a pair of second end portions that are located on opposite sides of the second intermediate portion, the second intermediate portion and the pair of second end portions are arranged in a second direction that is parallel to a direction in which the image light emitted propagates through the light guide member, and in the intensity distribution of the image light diffracted by and emitted from the turning holographic optical element, intensity is smaller in the pair of second end portions of the intensity distribution than in the second intermediate portion of the intensity distribution.

5. The light guide according to claim 1, wherein an intensity distribution of the image light diffracted by and emitted from the light-emitting holographic optical element includes a third intermediate portion and a third end portion that is located to surround the third intermediate portion, and in the intensity distribution of the image light diffracted by and emitted from the light-emitting holographic optical element, intensity is smaller in the third end portion of the intensity distribution than in the third intermediate portion of the intensity distribution.

6. The light guide according to claim 1, wherein an intensity distribution of the image light diffracted by and emitted from the turning holographic optical element includes a second intermediate portion and a pair of second end portions that are located on opposite sides of the second intermediate portion, the second intermediate portion and the pair of second end portions are arranged in a second direction that is parallel to a direction in which the image light emitted propagates through the light guide member, an intensity distribution of the image light diffracted by and emitted from the light-emitting holographic optical element includes a third intermediate portion and a third end portion that is located to surround the third intermediate portion, in the intensity distribution of the image light diffracted by and emitted from the light-entering holographic optical element, intensity is smaller in the pair of first end portions of the intensity distribution than in the first intermediate portion of the intensity distribution, in the intensity distribution of the image light diffracted by and emitted from the turning holographic optical element, intensity is smaller in the pair of second end portions of the intensity distribution than in the second intermediate portion of the intensity distribution, and in the intensity distribution of the image light diffracted by and emitted from the light-emitting holographic optical element, intensity is smaller in the third end portion of the intensity distribution than in the third intermediate portion of the intensity distribution.

7. The light guide according to claim 6, wherein at least one of the intensity distribution of the light-entering holographic optical element in the first direction, the intensity distribution of the turning holographic optical element in the second direction, or the intensity distribution of the light-emitting holographic optical element in the first direction and the second direction has a trapezoidal shape, a triangular shape, a semicircular shape, or a stepped shape.

8. A display device comprising:

the light guide according to claim 1; and the image light emitter that outputs the image light to the light guide.

9. A display device comprising:

a holographic optical element that receives image light emitted from an image light emitter;

a light guide member that includes the holographic optical element, wherein, in an intensity distribution of the image light diffracted by and emitted from the holographic optical element, intensity is smaller in an end portion of the intensity distribution than in an intermediate portion of the intensity distribution; and the image light emitter that outputs the image light to the light guide, wherein the image light emitter emits the image light whose intensity distribution has a trapezoidal shape, a triangular shape, or a semicircular shape according to a distribution of diffraction efficiency of the holographic optical element.

* * * * *